(12) United States Patent
Heim et al.

(10) Patent No.: US 6,734,853 B2
(45) Date of Patent: May 11, 2004

(54) METHOD OF USING VIEW FRUSTRUM CULLING FOR SCALEABLE COLLISION DETECTION

(75) Inventors: Oliver A. Heim, Portland, OR (US); Carl S. Marshall, Portland, OR (US)

(73) Assignee: Intel Corporation, Santa Clara, CA (US)

(*) Notice: Subject to any disclaimer, the term of this patent is extended or adjusted under 35 U.S.C. 154(b) by 309 days.

(21) Appl. No.: 09/941,501

(22) Filed: Aug. 28, 2001

(65) Prior Publication Data

US 2003/0043147 A1 Mar. 6, 2003

(51) Int. Cl.$^7$ .............................................. G06T 15/40
(52) U.S. Cl. .................................... 345/421; 345/623
(58) Field of Search ................................. 345/620, 621, 345/622, 623, 428, 421; 463/30, 31, 32, 33

(56) References Cited

U.S. PATENT DOCUMENTS 6,597,363 B1 * 7/2003 Duluk et al. ................ 345/506

OTHER PUBLICATIONS

Tomas Moller, Eric Haines; "Real–Time Rendering", 1999, pp. 194–200, 289–336, 341–361, A K Peters, Natick, MA, USA.

* cited by examiner

Primary Examiner—Mark Zimmerman
Assistant Examiner—Michael V Whelpley
(74) Attorney, Agent, or Firm—Steven P. Skabrat

(57) ABSTRACT

Processing a scene graph includes applying view frustrum culling to sort models of the scene graph into first and second lists of models, the first list comprising models at least one of within a view frustrum and intersecting with the view frustrum, the second list comprising models outside of the view frustrum, and applying a first selected collision detection process to pairs of models of the first list. The method further includes applying a second selected collision detection process to pairs of models of the second list. In some embodiments, the first collision detection process is more computationally intensive than the second collision detection process.

28 Claims, 2 Drawing Sheets

METHOD OF USING VIEW FRUSTRUM CULLING FOR SCALEABLE COLLISION DETECTION

BACKGROUND

1. Field

The present invention relates generally to computer graphics and, more specifically, to collision detection of objects in three dimensional (3D) scenes.

2. Description

One goal of 3D computer graphics is to achieve a realistic, interactive experience. As processor performance increases, more processing power becomes available for implementing a variety of graphical techniques that can be executed in real-time to enhance the overall virtual experience for a user. Collision detection is one technique that allows the addition of immersive features to a virtual interactive experience by providing important visual cues about object interactions in a computer-simulated environment.

Collision detection involves determining if objects in a 3D scene are in contact with each other at a given instance in time. In traditional collision detection algorithms, each model representing an object in a scene is tested against all other models in a pair-wise fashion in order to determine if any of them overlap or collide. For a scene containing a large number of complex models, this brute force technique becomes prohibitively time consuming and may be a limiting factor for overall simulation performance.

As a result, collision detection processing in some systems has been divided into two levels. A first level reports potential collisions among all objects in the environment. These results are then sent to a second level, which performs exact collision detection between each pair of objects. In order to minimize invocations of the second level system (that is, to report as few potential object/object collisions as possible), each object is enclosed in a bounding volume and an algorithm is applied to find all bounding volume/bounding volume pairs that overlap.

Despite such improvements in 3D scene processing, better approaches are needed to provide a user with the best possible immersive experience.

BRIEF DESCRIPTION OF THE DRAWINGS

The features and advantages of the present invention will become apparent from the following detailed description of the present invention in which.

DETAILED DESCRIPTION

Figure 1:
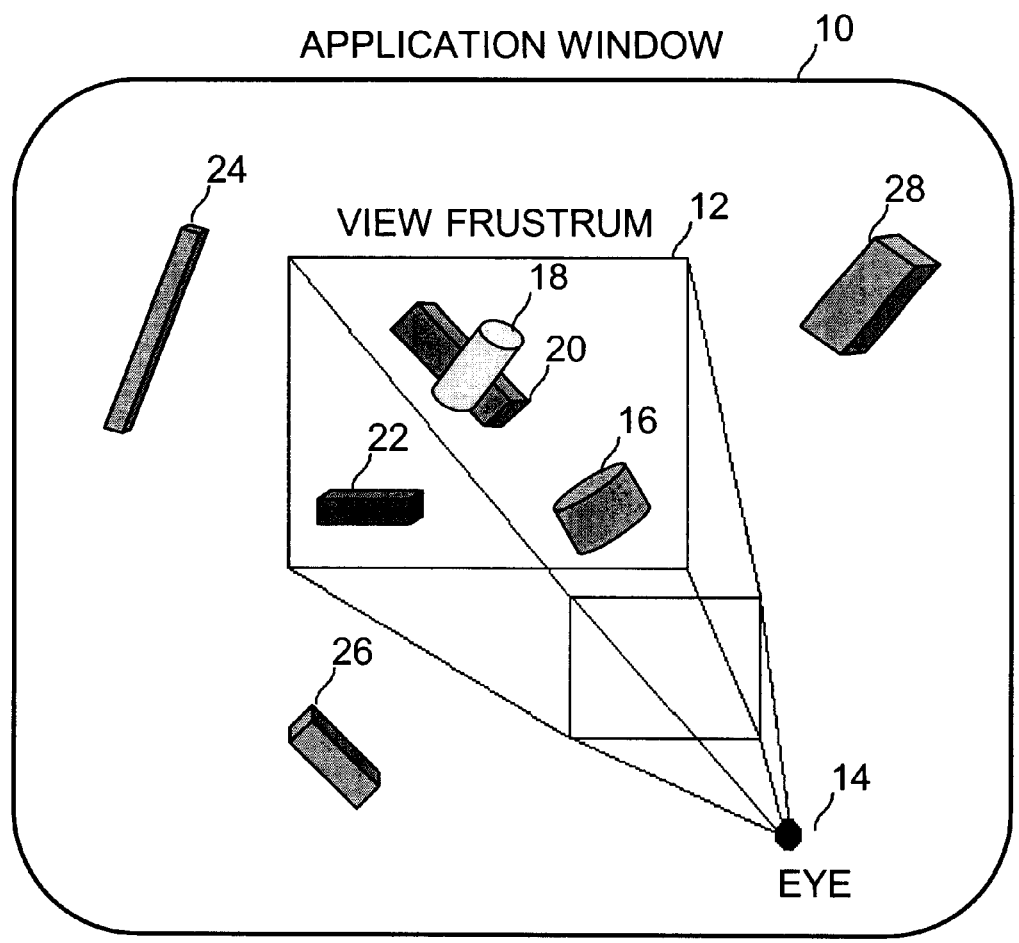
FIG. 1 is a diagram of a view frustrum within an application window according to an embodiment of the present invention.

An embodiment of the present invention is a method of using a view frustrum to cull models from a scene to reduce the number of object to object interactions that must be tested during collision detection processing. Additionally, a first selected one of several possible collision detection processes may be applied to the models still remaining in the visible portion of the scene for purposes of collision detection, as well as a second selected one of several possible collision detection processes may be applied to those models culled from the visible portion of the scene. In various embodiments, the first and second collision detection processes may be the same or different. In one embodiment, a more accurate, more detailed, and more computationally intensive first collision detection algorithm may be used for the models within the view frustrum, and, optionally, a less accurate, less detailed, and less computationally intensive second collision detection algorithm may be used for models outside the view frustrum. By performing computationally intensive processing only for models remaining in the visible scene after culling, overall system performance may be improved.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

A brief presentation of definitions of terms may be helpful to an understanding of the present invention. As used herein, a model is a collection of geometric entities, such as points, lines, and polygons. A model may represent a physical world object. A scene is a collection of models comprising everything that is included in an environment to be rendered. Rendering is the activity of making images rapidly appear on a computer display. The images may be based on a set of rendering primitives (also called drawing primitives) comprising points, lines, and triangles. A scene can also include material descriptions, lighting, and viewing specifications. A view frustrum is a pyramid that is truncated by a near and a far plane (which are parallel), making the volume finite. The view frustrum volume defines the parts of the scene that should be visible and thus rendered (in perspective for a pyramidal frustrum), when the position of a virtual camera is at the apex of the pyramid.

A bounding volume (BV) is a volume that encloses a set of objects. A BV does not contribute visually to a rendered image; instead it is usually used in techniques to speed up computations and rendering processing. For a complex scene, BVs are often organized in a bounding volume hierarchy. One data structure which may be used to store the hierarchy is a directed acyclic graph. The term acyclic means that the graph must not contain any loops or cycles. The term directed means that as two nodes of the graph are connected by an edge, they are also connected in a certain order, e.g., from parent to child. A directed acyclic graph has a root, the topmost node having no parent, internal nodes, which have children, and leaves, which have no children. A leaf node stores actual geometry to be rendered. An internal node stores pointers to its children and possibly a transform operation that may be applied to all its children. Both leaves and internal nodes may be enclosed by BVs. The most common BVs are spheres, axis-aligned bounding boxes (AABBs), oriented bounding boxes (OBBs), and discrete oriented polytopes (k-DOPs). An AABB is a box whose faces are aligned with the main axis directions (the faces have normals that coincide with the standard basis axes). An OBB is a box whose faces have normals that are all pairwise orthogonal (i.e., it is an AABB that is arbitrarily rotated). A k-DOP is a convex polytope whose faces are determined by a small, fixed set of k normals, where the outward half-space of the normals is not considered part of the BV.

Generally, only primitives that are totally or partially inside the view frustrum at a given point in time need to be rendered. FIG. 1 is a diagram of a view frustrum within an application window according to an embodiment of the present invention. Application window 10 represents output data of an application program being executed by a processor. The output data may be shown on a computer display in a manner well known in the art. Within application window 10 resides a view frustrum 12. The view frustrum represents the current viewing area within a scene according to the "eye" of a virtual camera 14. The user sees on the display only what is currently within the view frustrum. As can be seen in this example, objects 16, 18, 20, and 22 are within the view frustrum, and objects 24, 26, and 28 are outside the view frustrum. Thus, objects 16, 18, 20 and 22 may be rendered to be visible to the user. However, objects 24, 26, and 28 need not be rendered because, since they are outside the current view frustrum, they will be clipped by the graphics pipeline processing and not drawn on the display.

One way to speed up the graphics processing is to compare the BV of each object (model) to the view frustrum. If the BV is outside the frustrum, then the geometry it encloses can be omitted from rendering. Since these computations are done in software and executed by a processor (rather than being done in graphics hardware), this means that the geometry inside the BV does not need to go through the geometry and rasterizer stages of a graphics processing pipeline, thereby improving system performance. If instead the BV is inside or intersecting the frustrum, then the contents of that BV may be visible and must be sent through rendering processing.

Such view frustrum culling exploits the spatial coherence in a scene, since objects which are located near each other can be enclosed in a BV, and nearby BVs may be clustered hierarchically. View frustrum culling may be applied hierarchically with an in-order traversal from the root of the scene graph. Each node with a BV may be tested against the frustrum. If the BV of any type of node is outside the frustrum, then that node is not processed further for rendering. In a sense, the tree may be pruned, since the BV's subtree is outside the view. If the BV intersects the frustrum, graph traversal may continue and the node's children may be tested. When a leaf node is found to intersect, the node's contents (i.e., its geometry) may be processed further. The primitives of the leaf are not guaranteed to be inside the view frustrum. Clipping takes care of ensuring that only primitives inside the view frustrum are rendered. If the BV is fully inside the frustrum, its contents must all be inside the frustrum. Traversal continues, but no further frustrum testing is needed for the rest of such a subtree. A leaf node that is fully inside the frustrum can be rendered with clipping turned off.

Various methods are known for testing for intersection between various types of bounding volumes and a view frustrum. Intersection means that two bounding volumes overlap in some way. A chosen method should determine, for each model, whether the model is totally inside the frustrum, totally outside frustrum, or whether it intersects the frustrum. For purposes of embodiments of the present invention, if a BV intersects the view frustrum, it may be considered to be within the view frustrum, thereby reducing the technique to an exclusion/inclusion test. In various embodiments of the present invention, any selected one of several known view frustrum intersection methods, such as frustrum/sphere intersection, frustrum/box intersection, or any other suitable view frustrum intersection technique may be employed.

For each model within the scene graph, embodiments of the present invention determine if the model is inside or outside the view frustrum 12. If the model is inside the view frustrum, the model may be added to a first list, called a visible models list. If the model is outside the view frustrum, the model may be added to a second list, called a non-visible models list. Thus, by applying view frustrum culling to a scene graph, the models making up the scene graph may be sorted into two sets. In known systems, this type of sorting is typically used to speed up subsequent rendering processing, because only models within the view frustrum need be rendered. However, embodiments of the present invention use these sorted lists for a different purpose. In the present invention, the sorted lists of models may be used to improve collision detection performance.

A process commonly implemented in the application stage of a rendering pipeline is collision detection. Collision detection is part of what may be referred to as interference detection, which can be divided into three major parts: collision detection, collision determination, and collision response. Collision detection detects whether two objects collide, while collision determination finds the actual intersections between a pair of objects. Collision response, which is application-dependent, determines which actions should be taken in response to the collision of two objects.

In traditional collision detection algorithms, all models of a scene graph would be tested against each other in order to determine if they are overlapping. For a scene containing a large number of objects, this becomes computationally expensive.

In contrast, embodiments of the present invention comprise a scaleable collision detection technique based on view frustrum culling. By creating separate lists of models inside the view frustrum and of models outside the view frustrum, application performance may be improved by reducing the number of object—object intersection tests that must be performed during collision detection. In addition, scalability is provided by allowing selected ones of various overlap methods to be used for each pair wise intersection test. Models inside the view frustrum may be tested with highest resolution, highest accuracy, more computationally intensive overlap methods such as known mesh/mesh intersection or triangle/triangle intersection tests (e.g., tests to the polygon level). Models outside the view frustrum may be tested, if at all, with lower resolution, lower accuracy, less computationally intensive overlap methods such as known bounding volume/bounding volume tests (e.g., sphere/sphere intersection, AABB/AABB intersection, k-DOP/k-DOP intersection, OBB/OBB intersection, or other bounding volume methods). Furthermore, the method used for each case may be selected, such that multiple methods may be used rather than having the system limited to a single collision detection technique. Depending on the level of computational resources available, different intersection methods may be selected for models on each list at different times, thereby providing scaleable collision detection processing. That is, the collision detection process used may be dynamically changed. When ample processing power is available, a computationally expensive but more accurate method may be selected. When processing power is limited, a computationally cheaper, but less accurate method may be selected.

Figure 2:
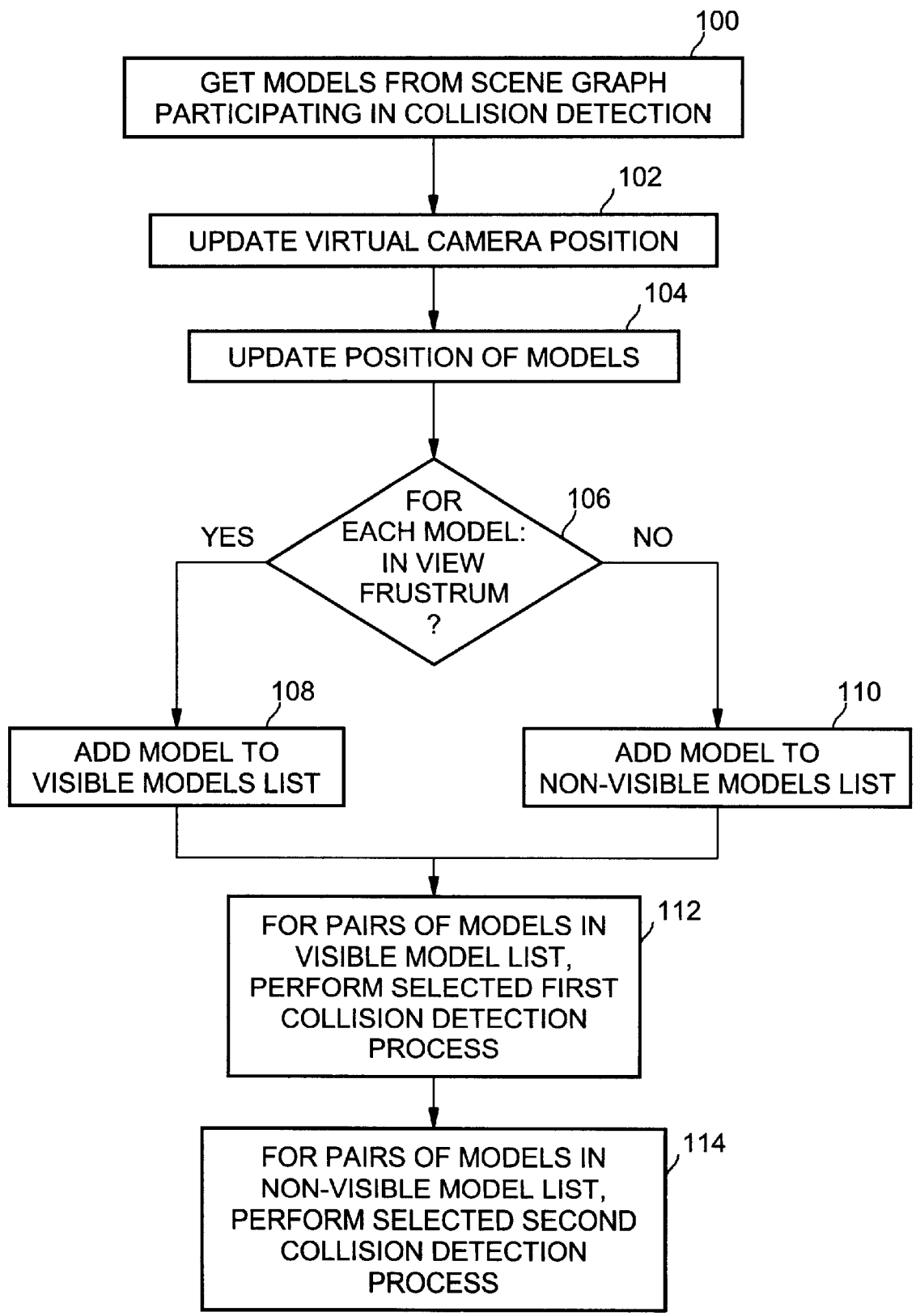
FIG. 2 is a flow diagram illustrating using a view frustrum to cull models from a scene for purposes of improved collision detection processing according to an embodiment of the present invention.

FIG. 2 is a flow diagram illustrating using a view frustrum to cull models from a scene for purposes of improved collision detection processing according to an embodiment of the present invention. The following processing may be performed in real-time for each frame of output data of an application program. At block 100, the models from a scene graph may be obtained for purposes of collision detection processing. At block 102, the position of the virtual camera may be updated. Since the virtual camera may have changed position from the previous frame, the positions of the models of the scene graph may be updated at block 104. At block 106, each model of the scene graph may be examined to determine if the model is inside or intersecting the view frustrum defined by the current virtual camera position. If the model is inside or intersecting the view frustrum, at block 108 the model may be added to a first list, called a visible models list. If the model is outside the view frustrum, at block 110 the model may be added to a second list, called the non-visible models list. Determination of whether the model is inside or outside the view frustrum may be accomplished by any appropriate view frustrum intersection test (e.g., frustrum/sphere intersection, frustrum/box intersection). When all models have been examined, collision detection processing may be performed.

At block 112, for all pairs of models in the visible model list, a first selected collision detection process at the polygon level may be performed. In one embodiment, a mesh/mesh intersection method may be performed. In another embodiment, a triangle/triangle intersection method may be performed. In one embodiment, an interval overlap method for triangle/triangle intersection processing may be used. In another embodiment, ERIT's method for triangle/triangle intersection processing may be used. As a result of performing block 112, the system knows the models within the view frustrum that have collided in the current frame and an appropriate collision response may be generated by the application program.

At block 114, for all pairs of models in the non-visible model list, a second selected collision detection process at the bounding volume level may be performed. In one embodiment, a sphere/sphere intersection test may be performed. For spheres, the intersection test comprises computing the distance between the centers of the two spheres and then trivially rejecting a collision if this distance is greater than the sum of the radii of the two spheres. Otherwise, the spheres intersect. In some embodiments, more complex BVs than the sphere may be used. In another embodiment, an AABB/AABB intersection test may be performed. In other embodiments, a k-DOP/k-DOP intersection, OBB/OBB intersection, or other bounding volume method may be performed. As a result of performing block 114, the system knows the models outside the view frustrum that have collided in the current frame and an appropriate collision response may be generated. In some embodiments, any detected collisions may be resolved.

In one embodiment, the first and second collision detection processes may be the same. In another embodiment, performance of the second collision detection process may be omitted. In yet another embodiment, the application may select the first and second collision detection processes to be used depending on the available processing capability of the system, and dynamically change the selection of which technique is used. In still another embodiment, the collision detection methods selected for the first and second lists may be chosen based on positioning of the view frustrum according to predetermined criteria.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. Some embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of processing a scene graph comprising:
    applying view frustrum culling to sort models of the scene graph into first and second lists of models, the first list comprising models at least one of within a view frustrum and intersecting with the view frustrum, the second list comprising models outside of the view frustrum;
    applying a first selected collision detection process to pairs of models of the first list; and
    applying a second selected collision detection process to pairs of models of the second list.

2. The method of claim 1, wherein the first collision detection process is more computationally intensive than the second collision detection process.

3. The method of claim 1, wherein the first selected collision detection process comprises a polygon level intersection process.

4. The method of claim 3, wherein the polygon level intersection process comprises a mesh to mesh intersection process.

5. The method of claim 3, wherein the polygon level intersection process comprises a triangle to triangle intersection process.

6. The method of claim 1, wherein the second selected collision detection process comprises a bounding volume level process.

7. The method of claim 6, wherein the bounding volume level process comprises at least one of sphere to sphere intersection processing, axis-aligned bounding box (AABB)/AABB intersection processing, discrete oriented polytopes (k-DOP)/k-DOP intersection processing, and oriented bounding boxes (OBB)/OBB intersection processing.

8. The method of claim 1, wherein applying view frustrum culling comprises performing at least one of frustrum/sphere intersection processing and frustrum/box intersection processing.

9. The method of claim 1, further comprising dynamically changing the selection of the first collision detection process.

10. An article comprising: a storage medium having a plurality of machine readable instructions, wherein when the instructions are executed by a processor, the instructions provide for processing of a scene graph by applying view frustrum culling to sort models of the scene graph into first and second lists of models, the first list comprising models at least one of within a view frustrum and intersecting with the view frustrum, the second list comprising models outside of the view frustrum; by applying a first selected collision detection process to pairs of models of the first list; and by applying a second selected collision detection process to pairs of models of the second list.

11. The article of claim 10, wherein the first collision detection process is more computationally intensive than the second collision detection process.

12. The article of claim 10, wherein instructions for the first selected collision detection process comprise instructions for a polygon level intersection process.

13. The article of claim 12, wherein instructions for the polygon level intersection process comprise instructions for a mesh to mesh intersection process.

14. The article of claim 12, wherein instructions for the polygon level intersection process comprise instructions for a triangle to triangle intersection process.

15. The article of claim 10, wherein instructions for the second selected collision detection process comprise instructions for a bounding volume level process.

16. The article of claim 15, wherein instructions for the bounding volume level process comprise instructions for at least one of sphere to sphere intersection processing, axis-aligned bounding box (AABB)/AABB intersection processing, discrete oriented polytopes (k-DOP)/k-DOP intersection processing, and oriented bounding boxes (OBB)/OBB intersection processing.

17. The article of claim 10, wherein instructions for applying view frustrum culling comprise instructions for performing at least one of frustrum/sphere intersection processing and frustrum/box intersection processing.

18. The article of claim 10, further comprising instructions for dynamically changing the selection of the first collision detection process.

19. A method of processing a scene graph, comprising:
obtaining models from the scene graph;
updating a position of a virtual camera;
updating a position for at least one of the models;
applying view frustrum culling to sort models of the scene graph into first and second lists of models, the first list comprising models at least one of within a view frustrum and intersecting with the view frustrum, the second list comprising models outside of the view frustrum;
applying a first selected collision detection process to pairs of models of the first list; and
applying a second selected collision detection process to pairs of models of the second list.

20. The method of claim 19, wherein the first collision detection process is more computationally intensive than the second collision detection process.

21. The method of claim 20, wherein the first selected collision detection process comprises a polygon level intersection process.

22. The method of claim 20, wherein the second selected collision detection process comprises a bounding volume level process.

23. The method of claim 19, further comprising dynamically changing the selection of the first collision detection process.

24. An article comprising: a storage medium having a plurality of machine readable instructions, wherein when the instructions are executed by a processor, the instructions provide for processing of a scene graph by obtaining models from the scene graph, updating a position of a virtual camera, updating a position for at least one of the models, applying view frustrum culling to sort models of the scene graph into first and second lists of models, the first list comprising models at least one of within a view frustrum and intersecting with the view frustrum, the second list comprising models outside of the view frustrum, applying a first selected collision detection process to pairs of models of the first list, and applying a second selected collision detection process to pairs of models of the second list.

25. The article of claim 24, wherein the first collision detection process is more computationally intensive than the second collision detection process.

26. The article of claim 25, wherein instructions for the first selected collision detection process comprise instructions for a polygon level intersection process.

27. The article of claim 25, wherein instructions for the second selected collision detection process comprise instructions for a bounding volume level process.

28. The article of claim 24, further comprising instructions for dynamically changing the selection of the first collision detection process.

* * * * *